United States Patent
Matsumoto et al.

(10) Patent No.: US 11,896,959 B2
(45) Date of Patent: Feb. 13, 2024

(54) HYDROTREATING CATALYST FOR HYDROCARBON OIL, METHOD FOR PRODUCING THE SAME, AND METHOD FOR HYDROTREATING HYDROCARBON OIL

(71) Applicant: JGC Catalysts and Chemicals Ltd., Kawasaki (JP)

(72) Inventors: Yusuke Matsumoto, Kitakyushu (JP); Midori Kobayashi, Kitakyushu (JP); Hisaya Ishihara, Kitakyushu (JP)

(73) Assignee: JGC Catalysts and Chemicals Ltd., Kawasaki (JP)

( * ) Notice: Subject to any disclaimer, the term of this patent is extended or adjusted under 35 U.S.C. 154(b) by 281 days.

(21) Appl. No.: 17/280,553

(22) PCT Filed: Sep. 6, 2019

(86) PCT No.: PCT/JP2019/035227
§ 371 (c)(1),
(2) Date: Mar. 26, 2021

(87) PCT Pub. No.: WO2020/066555
PCT Pub. Date: Apr. 2, 2020

(65) Prior Publication Data
US 2022/0072517 A1 Mar. 10, 2022

(30) Foreign Application Priority Data

Sep. 28, 2018 (JP) .................... 2018-184889

(51) Int. Cl.
| | |
|---|---|
| *B01J 23/883* | (2006.01) |
| *B01J 35/10* | (2006.01) |
| *B01J 35/00* | (2006.01) |
| *B01J 27/14* | (2006.01) |
| *B01J 21/04* | (2006.01) |
| *B01J 21/06* | (2006.01) |
| *B01J 6/00* | (2006.01) |
| *B01J 37/02* | (2006.01) |
| *B01J 37/06* | (2006.01) |
| *B01J 37/08* | (2006.01) |
| *B01J 23/882* | (2006.01) |

(52) U.S. Cl.
CPC ............ *B01J 23/883* (2013.01); *B01J 6/001* (2013.01); *B01J 21/04* (2013.01); *B01J 21/06* (2013.01); *B01J 23/882* (2013.01); *B01J 27/14* (2013.01); *B01J 35/0006* (2013.01); *B01J 35/1019* (2013.01); *B01J 35/1057* (2013.01); *B01J 37/0201* (2013.01); *B01J 37/06* (2013.01); *B01J 37/08* (2013.01)

(58) Field of Classification Search
CPC ........ B01J 23/883; B01J 23/882; B01J 21/04; B01J 21/06; B01J 6/001; B01J 27/14; B01J 35/0006; B01J 35/1019; B01J 35/1057; B01J 37/0201; B01J 37/06; B01J 37/08
See application file for complete search history.

(56) References Cited

U.S. PATENT DOCUMENTS

| | | |
|---|---|---|
| 8,128,805 B2 | 3/2012 | Vaarkamp |
| 9,187,702 B2 | 11/2015 | Zhan et al. |
| 2003/0173252 A1 | 9/2003 | Vaarkamp |
| 2011/0000824 A1 | 1/2011 | Zhan et al. |
| 2012/0077666 A1 | 3/2012 | Vaarkamp |
| 2016/0030934 A1 | 2/2016 | Zhan et al. |

FOREIGN PATENT DOCUMENTS

| | | | |
|---|---|---|---|
| JP | 2000000465 A | 1/2000 | |
| JP | 2003531002 A | 10/2003 | |
| JP | 2004073912 A | 3/2004 | |
| JP | 2005254141 A | 9/2005 | |
| JP | 2007308563 A | 11/2007 | |
| JP | 2014147931 A | 8/2014 | |
| JP | 2015157248 A | 9/2015 | |
| JP | 2016028134 A | 2/2016 | |
| JP | 2016203074 A | 12/2016 | |
| JP | 2017196550 A | * 11/2017 | ............ B01J 21/04 |
| JP | 2017196550 A | 11/2017 | |
| JP | 2018009175 A | 1/2018 | |
| WO | 2017187187 A1 | 11/2017 | |

* cited by examiner

*Primary Examiner* — Yong L Chu
(74) *Attorney, Agent, or Firm* — The Webb Law Firm

(57) ABSTRACT

To provide a catalyst capable of hydrotreating a hydrocarbon oil with high desulfurization activity.

A hydrotreating catalyst for a hydrocarbon oil includes: an inorganic composite oxide carrier including alumina as a main component; and an active metal component supported on the carrier, the active metal component including, as active metal species, a first metal which is at least one of molybdenum and tungsten, and a second metal which is at least one of cobalt and nickel, the hydrotreating catalyst for having a Lewis acid amount and a Brönsted acid amount per unit surface area of 0.80 µmol/m² or more and 0.03 µmol/m² or less, respectively, as measured by pyridine desorption at 250° C. and a BET single-point method.

17 Claims, No Drawings

HYDROTREATING CATALYST FOR HYDROCARBON OIL, METHOD FOR PRODUCING THE SAME, AND METHOD FOR HYDROTREATING HYDROCARBON OIL

CROSS-REFERENCE TO RELATED APPLICATIONS

This application is the United States national phase of International Application No. PCT/JP2019/035227 filed Sep. 6, 2019, and claims priority to Japanese Patent Application No. 2018-184889 filed Sep. 28, 2018, the disclosures of which are hereby incorporated by reference in their entirety.

TECHNICAL FIELD

The present invention relates to a hydrotreating catalyst for removing a sulfur content in a hydrocarbon oil in the presence of hydrogen, a method for producing the same, and a method for hydrotreating a hydrocarbon oil.

BACKGROUND ART

In the hydrotreatment of a hydrocarbon oil, the reaction proceeds under high temperature and high pressure using a catalyst, but, since the economical efficiency of the process is improved by lowering the temperature and pressure as reaction conditions, hydrotreating catalysts that can be produced smoothly and are highly active are desired.

Conventionally, catalysts containing active metal components selected from Group 6A and Group 8 of the Periodic Table on an alumina carrier have been widely used. As a proposal for improving the catalytic activity, a method for improving the activity by adjusting the carrier-active metal interaction is known. For example, as an approach from a carrier, a technique of modifying the surface properties of the carrier has been reported. Specifically, a method of adjusting the interaction between the carrier and the active metals by changing the properties of the surface OH group of the carrier, or a method of forming a composite of a component other than alumina, for example, titania, to alter the electronical interaction between the carrier and the metals are widely known. However, it cannot still be said that sufficient catalytic activity has been attained in such methods, and further improvement of the catalytic activity is required.

JP 2003-531002 A and JP 2014-147931 A disclose catalysts having a solid acid derived from zeolite. Zeolite contained, in an amount of 5 to 50 mass % or 10 to 60 mass %, in the carrier is a solid acid component, and the catalysts are characterized in that the solid acid is a Brönsted acid and that the active metal component is a noble metal.

JP 2000-465 A discloses a solid acid catalyst to which a silica-containing alumina carrier is applied. In this solid acid catalyst, the active metal component is a transition metal such as molybdenum, nickel or cobalt, the silica content is as high as 30 mass % or more, and the solid acid component is a Brönsted acid.

JP 2018-9175 A and JP 2016-28134 A disclose carriers containing 10 to 70 mass % of silica, which may further contain one or more types of Y-zeolite. The solid acid component has 1 to 40 µmol/g of a Brönsted acid, and contains 10 mass % or more of silica, and optionally zeolite.

JP 2004-73912 A discloses a catalyst which includes a silica-alumina carrier having a structure in which a silica layer is formed on the surface of alumina and containing 2 to 40 mass % of silica based on the total weight of the carrier, the catalyst having a great characteristic in pore volume distribution. Although JP 2004-73912 A refers to solid acidity, the adjustment of solid acidity is performed by the content of silica, and the effects are said to be an effect of improving the dispersibility of the active ingredient and an effect of increasing the cracking activity by a relatively strong acid site.

JP 2017-196550 A discloses a hydrotreating catalyst for a hydrocarbon oil, having predetermined properties, wherein a first metal component selected from molybdenum and tungsten and a second metal component selected from cobalt and nickel are supported as active metals on an inorganic composite oxide carrier in which a foreign element metal is mixed with γ-alumina, and also describes that this catalyst is excellent in desulfurization activity while maintaining high industrial productivity, and is reproducible with high performance.

SUMMARY OF INVENTION

Technical Problem

As described above, generally, the surface OH groups and the dispersibility of heteroelements have attracted attention as a surface property of a carrier capable of interacting with the active metal of a hydrotreating catalyst for a hydrocarbon oil. However, there is room for further improvement in catalytic activity of the hydrotreating catalyst for a hydrocarbon oil. On the other hand, a solid acid is present in the catalyst, and in particular, a Lewis acid site has the property of being involved in the transfer of electrons.

An object of the present invention is to provide a catalyst capable of hydrotreating a hydrocarbon oil with high desulfurization activity and a method for producing the same.

Another object of the present invention is to provide a method for hydrotreating a hydrocarbon oil, which can hydrotreat a hydrocarbon oil with high desulfurization activity.

Solution to Problem

As a result of diligent research to solve the above problems, the present inventors have found that the ability to hydrodesulfurize a hydrocarbon oil is improved by setting the Lewis acid amount in a hydrotreating catalyst within an appropriate range, and have completed the present invention. On the other hand, in the prior art, attention has not been paid to the relationship between the carrier-active metal interaction at the Lewis acid site of the carrier or the reaction activity.

The gist of the present invention is as follows.

[1]

A hydrotreating catalyst for a hydrocarbon oil, including:
an inorganic composite oxide carrier including alumina as a main component, and an active metal component supported on the carrier,
the active metal component including, as active metal species, a first metal which is at least one of molybdenum and tungsten, and a second metal which is at least one of cobalt and nickel,
the hydrotreating catalyst having a Lewis acid amount and a Brönsted acid amount per unit surface area of 0.80 µmol/m$^2$ or more and 0.03 µmol/m$^2$ or less, respectively, as measured by pyridine desorption at 250° C. and a BET single-point method.

[2]

The hydrotreating catalyst for a hydrocarbon oil according to the [1], wherein a content of the first metal is 15 to 22 mass % in terms of oxide, and a content of the second metal is 2 to 7 mass % in terms of oxide.

[3]

The hydrotreating catalyst for a hydrocarbon oil according to the [1] or [2], containing less than 2.0 mass % of carbon.

[4]

The hydrotreating catalyst for a hydrocarbon oil according to any one of the [1] to [3], having a specific surface area of 200 to 350 m$^2$/g.

[5]

The hydrotreating catalyst for a hydrocarbon oil according to any one of the [1] to [4], having an average pore diameter of 50 to 100 Å as measured by a mercury intrusion method.

[6]

The hydrotreating catalyst for a hydrocarbon oil according to any one of the [1] to [5], having a mass reduced when heat-treated at 570° C. for 2 hours in an air atmosphere of 5.0 mass % or less.

[7]

The hydrotreating catalyst for a hydrocarbon oil according to any one of the [1] to [6], having an amount of nitrogen monoxide adsorbed after sulfurization treatment of 8.5 ml/g or more.

[8]

The hydrotreating catalyst for a hydrocarbon oil according to any one of the [1] to [7], wherein the inorganic composite oxide carrier contains silicon and phosphorus in amounts of 0.5 to 8.0 mass % and 1.0 to 5.0 mass %, respectively, in terms of oxide, assuming that an amount of the carrier is 100 mass %.

[9]

The hydrotreating catalyst for a hydrocarbon oil according to the [8], wherein the active metal component contains phosphorus.

[10]

The hydrotreating catalyst for a hydrocarbon oil according to the [9], wherein Pa/Ps, which is a ratio of a proportion Pa of phosphorus contained in the active metal component to a proportion Ps of phosphorus contained in the carrier among the phosphorus contained in the catalyst, is in the range of 0.2 to 3.0.

[11]

The hydrotreating catalyst for a hydrocarbon oil according to the [9] or [10], wherein a proportion of the phosphorus contained in the active metal component to the first metal is in the range of 0.02 to 0.15 in terms of oxide mass.

[12]

The hydrotreating catalyst for a hydrocarbon oil according to any one of the [1] to [11], wherein the inorganic composite oxide carrier contains titanium in an amount of 5.0 mass % or less in terms of oxide, magnesium in an amount of 5.0 mass % or less in terms of oxide, or boron in an amount of 5.0 mass % or less in terms of oxide, assuming that the amount of the carrier is 100 mass %.

[13]

The hydrotreating catalyst for a hydrocarbon oil according to any one of the [1] to [12], wherein a proportion of the second metal to the first metal is in the range of 0.15 to 0.40 in terms of oxide mass.

[14]

A method for producing a hydrotreating catalyst for a hydrocarbon oil, including:

a step (1) of providing an inorganic composite oxide carrier including alumina as a main component, which contains silicon and phosphorus in amounts of 0.5 to 8.0 mass % and 1.0 to 5.0 mass %, respectively, in terms of oxide, assuming that the amount of the carrier is 100 mass %;

a step (2) of preparing an impregnating solution including a raw material for a first metal which is at least one of molybdenum and tungsten, a raw material for a second metal which is at least one of cobalt and nickel, a solvent, a phosphorus component, and an organic acid, and impregnating the inorganic composite oxide carrier with the impregnating solution; and a step (3) of drying and then calcining the inorganic composite oxide carrier impregnated with the impregnating solution obtained in the step (2) to give a hydrotreating catalyst.

[15]

The method for producing a hydrotreating catalyst according to the [14], wherein the step (1) of providing the inorganic composite oxide carrier includes:

a step (a) of adding a silica source and a phosphorus component to a basic aqueous solution of an aluminum salt to prepare a basic mixed aqueous solution containing a basic aluminum salt, and adding an acidic aqueous solution of an aluminum salt to the mixed aqueous solution;

a first aging step (b) of aging the inorganic composite oxide hydrate slurry obtained in the step (a);

a step (c) of washing the aged inorganic composite oxide hydrate slurry obtained in the step (b);

a second aging step (d) of aging the washed inorganic composite oxide hydrate slurry obtained in the step (c);

a step (e) of kneading and concentrating the aged inorganic composite oxide hydrate slurry obtained in the step (d) and molding the obtained kneaded product; and a step (f) of drying and calcining the molded product obtained in the step (e).

[16]

The method for producing a hydrotreating catalyst according to the [15], wherein, in the second aging step (d), the washed inorganic composite oxide hydrate slurry obtained in the step (c) is aged with adding ammonia water.

[17]

A method for hydrotreating a hydrocarbon oil, including hydrotreating a hydrocarbon oil in the presence of the hydrotreating catalyst according to any one of the [1] to [13].

Advantageous Effects of Invention

The hydrotreating catalyst of the present invention can hydrotreat a hydrocarbon oil with high desulfurization activity.

Further, according to the method for producing a hydrotreating catalyst of the present invention, it is possible to produce a catalyst for hydrotreatment capable of hydrotreating a hydrocarbon oil with high desulfurization activity.

Further, according to the method for hydrotreatment of a hydrocarbon oil of the present invention, a hydrocarbon oil can be hydrotreated with high desulfurization activity.

DESCRIPTION OF EMBODIMENTS

Hereinafter, the present invention will be described in more detail.

[Hydrotreating Catalyst for Hydrocarbon Oil]

The hydrotreating catalyst for a hydrocarbon oil of the present invention (hereinafter, also referred to simply as "hydrotreating catalyst" or "catalyst") includes:

an inorganic composite oxide carrier including alumina as a main component (hereinafter, also referred to simply as "carrier"); and an active metal component supported on the carrier.

The active metal component includes a first metal which is at least one of molybdenum and tungsten and a second metal which is at least one of cobalt and nickel.

The catalyst has a Lewis acid amount and a Brönsted acid amount per unit surface area of 0.80 μmol/m$^2$ or more and 0.03 μmol/m$^2$ or less, respectively, as measured by pyridine desorption at 250° C. and a BET single-point method.

The inorganic composite oxide carrier, the active metal component, and the properties of the catalyst will be described in detail below.

<Inorganic Composite Oxide Carrier>

The inorganic composite oxide carrier is a composite oxide of aluminum and other elements, including alumina as a main component. The phrase "including alumina as a main component" means that aluminum is usually contained in the carrier in an amount of 87.0 mass % or more in terms of oxide ($Al_2O_3$).

The inorganic composite oxide carrier usually contains silicon and phosphorus as the other elements.

The silicon content of the carrier is usually 0.5 to 8.0 mass %, preferably 1.0 to 5.0 mass % in terms of oxide (silica (SiO2)), and the phosphorus content of the carrier is usually 1.0 to 5.0 mass %, preferably 1.5 to 4.0 mass % in terms of oxide ($P_2O_5$). When the carrier is produced so that the above amounts of silicon and phosphorus are contained in the carrier, the surface condition of the carrier is adjusted, and the Lewis acid amount of the catalys according to the present invention is expected to be maintained appropriately (that is, 0.80 μmol/m$^2$ or more).

In order to increase the Lewis acid amount, it is preferable to produce the carrier so that the silicon content is 0.5 mass % or more. From the viewpoint of producing the carrier without aggregating silica, it is preferable to produce the carrier so that the silicon content is 8.0 mass % or less.

From the viewpoint of maintaining the acid properties of the carrier, the phosphorus content is preferably 1.0 mass % or more. Further, from the viewpoint of maintaining the pore structure of the carrier for supporting the active metal component, the phosphorus content is preferably 5.0 mass % or less.

In order to control the physical properties such as mechanical strength and heat resistance of the carrier, an appropriate binder component, an additive or the like may be contained in the raw material for the carrier at the time of forming the carrier.

Examples of the other elements include titanium (Ti), magnesium (Mg), and boron (B) in addition to silicon and phosphorus. These components are sometimes added in order to adjust the Lewis acid amount of the catalyst according to the present invention.

A content of titanium in the carrier is, for example, 0.5 to 5.0 mass % in terms of oxide ($TiO_2$).

A content of magnesium in the carrier is, for example, to 5.0 mass % in terms of oxide (MgO).

A content of boron in the carrier is, for example, 0.5 to 5.0 mass % in terms of oxide ($B_2O_3$).

A carrier surface area (described as "specific surface area $N_2$") of the carrier is preferably 280 to 380 m$^2$/g as determined by a BET single-point method for measuring nitrogen adsorption/desorption. A specific surface area $N_2$ of 280 m$^2$/g or more is preferable from the viewpoint of preventing aggregation of the active metal supported on the carrier. On the other hand, a specific surface area $N_2$ of 380 m$^2$/g or less is preferable from the viewpoint of preventing a reduction in average pore diameter or pore volume of the catalyst of the present invention and reduction in desulfurization performance thereof.

An average pore diameter of the carrier is preferably in the range of 60 to 100 Å as determined by a measurement method described later. When the average pore diameter is 60 Å or more, the desulfurization performance of the catalyst is good. When the average pore diameter is 100 Å or less, the specific surface area of the catalyst is large.

A pore volume of the carrier is preferably 0.65 to ml/g as measured by a mercury intrusion method. A pore volume of 0.65 ml/g or more is preferable from the viewpoint of preventing aggregation of the active metal component on the carrier. A pore volume of 0.85 ml/g or less is preferable from the viewpoint of preventing reduction in strength of the catalyst of the present invention due to a decrease in aerated bulk density (ABD) and an increase in average pore diameter.

<Active Metal Component and the Like>

An active metal component is supported on the inorganic composite oxide carrier. The active metal component includes, as an active metal species, a first metal which is at least one of molybdenum and tungsten, and a second metal which is at least one of cobalt and nickel. Therefore, an active metal component containing, for example, molybdenum which is the first metal and cobalt which is the second metal is supported on the carrier. Examples of the active metal component include oxides containing the first metal and the second metal.

The first metal may be molybdenum or tungsten, or both molybdenum and tungsten. A content (supported amount) of the first metal in the catalyst of the present invention is preferably 10 to 30 mass %, more preferably 15 to 22 mass % in terms of oxide (that is, $MoO_3$ or $WO_3$).

When the content of the first metal is not less than the lower limit value above, the catalyst of the present invention exhibits good desulfurization activity. It is preferable that the content of the first metal is not more than the upper limit value above, from the viewpoint of preventing aggregation of the first metal and providing good dispersibility thereof.

The second metal may be cobalt or nickel, or both cobalt and nickel. A content (supported amount) of the second metal in the catalyst of the present invention is usually 2.0 to 10.0 mass %, more preferably 2.0 to 8.0 mass % in terms of oxide (that is, CoO or NiO).

The second metal acts as a co-catalyst for the first metal. When the content of the second metal is not less than the lower limit value above, the first metal and the second metal, which are active metal species, can maintain their appropriate structures. When the content is not more than the upper limit value above, aggregation of the active metal component is suppressed, and the performance of the catalyst of the present invention is good. Therefore, the content of the second metal is most preferably in the range of 0.15 to 0.40 as a ratio of mass of the second metal (in terms of oxide)/mass of the first metal (in terms of oxide).

Furthermore, the active metal component preferably contains phosphorus. When phosphorus is contained in the active metal component, the Lewis acid amount of the catalyst of the present invention can be adjusted within a predetermined range.

The phosphorus content of the active metal component is preferably 0.5 to 5.0 mass % in terms of oxide ($P_2O_5$).

Furthermore, the phosphorus content of the active metal component is preferably in the range of 0.02 to 0.15 as a ratio of mass of phosphorus (in terms of oxide ($P_2O_5$))/mass of the first metal (in terms of oxide).

The fact that the phosphorus content of the active metal component is not more than the upper limit value above is preferable from the viewpoint of preventing reduction in desulfurization performance due to a significant decrease in surface area of the catalyst of the present invention and a decrease in dispersibility of the active metal component on the carrier.

As will be described later, the catalyst of the present invention can be prepared by bringing an impregnating solution that contains a raw material for the first metal, a raw material for the second metal, a solvent, phosphorus and an organic acid in contact with the inorganic composite oxide carrier. The catalyst of the present invention preferably contains phosphorus in both the active metal component and the carrier component, and the ratio thereof has an optimum value for keeping the Lewis acid amount of the catalyst of the present invention within a predetermined range. Further, in order to keep the Lewis acid amount per unit surface area of the catalyst at 0.80 $\mu mol/m^2$ or more as defined by the BET single-point method, it is preferable that phosphorus be contained in both the active metal component and the carrier component.

A ratio (Pa/Ps) of a content proportion Pa of phosphorus contained in the active metal component to a content proportion Ps of phosphorus contained in the carrier among the phosphorus contained in the catalyst of the present invention is preferably in the range of 0.2 to 3.0. When the ratio is in this range, the Lewis acid amount of the catalyst of the present invention can be kept within a predetermined range described later.

The catalyst of the present invention may contain carbon, and the amount thereof is preferably less than 2.0 mass %. When the catalyst of the present invention is produced through a step of impregnating the inorganic composite oxide carrier with the impregnating solution containing raw materials for the active metal component, an organic acid is usually contained in the impregnating solution, and carbon of this organic acid remains in the catalyst. By setting the carbon content to less than 2.0 mass %, the carrier-metal interaction can be adjusted to be weakened by the carbon derived from the organic acid, and the structure sustainability of the supported metal species is improved, so that the stability of the hydrodesulfurization reaction in the presence of the catalyst of the present invention is maintained. On the other hand, the lower limit value of the carbon content is, for example, 0 mass % (the detection limit or less).

<Lewis Acid Amount and the Like>

The Lewis acid amount of the catalyst of the present invention is 0.80 $\mu mol/m^2$ or more, preferably 0.85 $\mu mol/m^2$ or more, more preferably 0.90 $\mu mol/m^2$ or more, as measured by pyridine desorption at 250° C. and a BET single-point method under conditions adopted in the Examples described later or conditions equivalent thereto. Since the Lewis acid amount contained in the catalyst of the present invention is in this range, the active site is of good quality, the carrier-active metal interaction is adjusted, and the hydrodesulfurization catalytic ability is excellent.

On the other hand, the upper limit value of the Lewis acid amount may be, for example, 2.00 $\mu mol/m^2$ from the viewpoint of suppressing an excessive hydrodesulfurization in consideration of versatility in use, and is preferably 1.50 $\mu mol/m^2$ from the viewpoint of easiness of production. The Lewis acid amount can be set within the above range by a method of adjusting the content of silicon in the inorganic composite oxide carrier, a method of adjusting the proportion of the amount of phosphorus contained in the inorganic composite oxide carrier to the amount of phosphorus contained in the first metal component and the second metal component, or the like.

The Brönsted acid amount of the hydrotreating catalyst of the present invention is 0.03 $\mu mol/m^2$ or less, preferably $\mu mol/m^2$ or less, as measured by pyridine desorption at 250° C. and a BET single-point method under conditions adopted in the Examples described later or conditions equivalent thereto. When the Brönsted acid amount is in this range, the hydrotreating catalyst of the present invention can suppress the impartment of excessive cracking activity or the promotion of activity deterioration mainly due to coke formation. On the other hand, from the viewpoint of suppressing excessive catalytic reaction, the lower limit value of the Brönsted acid amount may be, for example, 0.00 $\mu mol/m^2$. The Brönsted acid amount can be set within the above range by means of reducing the silica content of the inorganic composite oxide carrier, not incorporating a molecular sieve substance such as zeolite in the inorganic composite oxide carrier, or the like.

The catalyst of the present invention has a specific surface area of preferably 200 to 350 $m^2/g$, more preferably 220 to 320 $m^2/g$, as measured by a method adopted in the Examples described later. It is preferable that the specific surface area be in this range because the reaction between the active site on the catalyst and the raw material oil proceeds efficiently and the catalytic reaction is enhanced.

The catalyst of the present invention has an average pore diameter of preferably 50 to 100 Å, more preferably 60 to 90 Å, as measured by the mercury intrusion method under conditions adopted in the Examples described later. When the average pore diameter is in this range, the raw material oil is sufficiently diffused in the pores, which is useful for the hydrotreating reaction.

The catalyst of the present invention has an ignition loss (Ig Loss), that is, a mass reduced when heat-treated at 570° C. for 2 hours in an air atmosphere, of preferably 5.0 mass % or less. The ignition loss of the catalyst of the present invention can be adjusted to 5.0 mass % or less, for example, by spray-impregnating the inorganic composite oxide carrier with the impregnating solution containing raw materials for the active metal component and then calcining them at a temperature of 300° C. or higher, when producing the catalyst of the present invention.

The catalyst of the present invention preferably has an amount of nitrogen monoxide adsorbed after sulfurization treatment of 8.5 ml/g or more, more preferably 9.0 to 12.0 ml/g, as measured under conditions adopted in the Examples described later. An amount of nitrogen monoxide adsorbed after sulfurization treatment falling within this range is preferable because the active sites for the hydrotreating reaction are sufficiently provided.

[Method for Hydrotreating Hydrocarbon Oil]

The hydrocarbon oil to be desulfurized by the hydrotreating catalyst of the present invention is, for example, straight-run kerosene or straight-run gas oil obtained from an atmospheric distillation apparatus for crude oil; vacuum gas oil or vacuum heavy gas oil obtained by treating straight-run heavy oil or residual oil obtained from an atmospheric distillation apparatus with a vacuum distillation apparatus; catalytically cracked kerosene or catalytically cracked gas oil obtained by catalytically cracking desulfurized heavy oil;

hydrocracked kerosene or hydrocracked gas oil obtained by hydrocracking vacuum heavy gas oil or desulfurized heavy oil; or thermally cracked kerosene or thermally cracked gas oil obtained from a thermal cracking device such as a coker, which is a distillate containing 80% by volume or more of a distillate having a boiling point of 180 to 390° C. The hydrotreatment using the hydrotreating catalyst of the present invention is carried out under high temperature and high pressure conditions in a hydrogen atmosphere with filling the fixed bed reactor with the catalyst.

[Method for Producing Catalyst for Hydrotreatment of Hydrocarbon Oil]

Next, a method for producing a hydrotreating catalyst for a hydrocarbon oil of the present invention will be described.

The method for producing a hydrotreating catalyst for a hydrocarbon oil according to the present invention includes:

- step (1) of providing an inorganic composite oxide carrier including alumina as a main component, which contains silicon and phosphorus in amounts of 0.5 to 8.0 mass % (preferably 1.0 to 5.0 mass %) and 1.0 to 5.0 mass % (preferably 1.5 to 4.0 mass %), respectively, in terms of oxide, assuming that the amount of the carrier is 100 mass %;
- step (2) of preparing an impregnating solution including a raw material for a first metal which is at least one of molybdenum and tungsten, a raw material for a second metal which is at least one of cobalt and nickel, a solvent, a phosphorus component, and an organic acid, and impregnating the inorganic composite oxide carrier with the impregnating solution; and
- step (3) of drying and then calcining the inorganic composite oxide carrier impregnated with the impregnating solution obtained in the step (2).

Hereinafter, each of the steps will be described.

<Step (1) of Providing Inorganic Composite Oxide Carrier>

In step (1), the inorganic composite oxide carrier is produced.

Step (1) preferably includes the following steps (a) to (f).

Step (a):

In step (1), first, a basic aqueous solution of a metal salt and an acidic aqueous solution of a metal salt (at least one of the aqueous solutions contains an aluminum salt) are mixed with a pH of 6.5 to 9.5, preferably 6.5 to 8.5, more preferably 6.8 to 8.0 to give a slurry of a hydrate of an inorganic composite oxide. The mixing is preferably carried out by gradually adding the acidic aqueous solution of the metal salt to the basic aqueous solution of the metal salt.

The basic aqueous solution may contain a carboxylate.

When a hydrate of an inorganic composite oxide containing an element other than aluminum is to be obtained as the hydrate of the inorganic composite oxide, the aqueous metal salt solution is premixed with an acidic or basic aqueous solution of an aluminum salt according to the pH of an aqueous solution of a metal salt (a salt of an element other than the aluminum, here, for convenience, silicates and phosphates are also classified as metal salts) to be used (that is, if it is an acidic aqueous solution of a metal salt, it is premixed with an acidic aqueous solution of an aluminum salt, or if it is a basic aqueous solution of a metal salt, it is premixed with a basic aqueous solution of an aluminum salt), and then the mixed aqueous solution is mixed with a basic aqueous solution of an aluminum salt or an acidic aqueous solution of an aluminum salt so that the pH is in the above range, to give a hydrate of an inorganic composite oxide.

As the aluminum salt used in the basic aqueous solution of the aluminum salt, sodium aluminate, potassium aluminate or the like is preferably used. Further, as the aluminum salt used in the acidic aqueous solution of the aluminum salt, aluminum sulfate, aluminum chloride, aluminum nitrate or the like is preferably used. A silicate is used as the silica source. Specifically, an aqueous sodium silicate solution (water glass) or a hydrogel of sodium silicate can be used. The phosphate source covers phosphorous acid ions. Phosphate compounds that generate phosphate ions in water, such as ammonium phosphate, potassium phosphate, sodium phosphate, phosphoric acid, and phosphorous acid, can be used as the phosphate source. Examples of the titanium mineral acid salt include titanium tetrachloride, titanium trichloride, titanium sulfate, titanyl sulfate, and titanium nitrate. Titanium sulfate and titanyl sulfate are particularly preferably used because they are inexpensive. Further, examples of the magnesia source include magnesium salts such as magnesium sulfate.

When the two aqueous metal salt solutions are mixed, for example, the basic aqueous solution of the metal salt is usually heated to 40 to 90° C., preferably 50 to 70° C. and held, and the acidic aqueous solution of the metal salt heated to the temperature of this solution ±5° C., preferably ±2° C., more preferably ±1° C. is continuously added to the basic aqueous solution of the metal salt over usually 5 to 20 minutes, preferably 7 to 15 minutes so that the pH is 6.5 to 9.5, preferably 6.5 to 8.5, more preferably 6.5 to 8.0, to form a precipitate, thereby giving a hydrate slurry (hereinafter, also referred to as "inorganic composite oxide hydrate slurry").

Here, the time required for adding the acidic aqueous solution of the metal salt to the basic aqueous solution of the metal salt is desirably 15 minutes or less, more preferably 13 minutes or less because unfavorable crystals such as bayerite and gibbsite may be generated in addition to pseudo-boehmite if the time is long. Bayerite and gibbsite are not preferable because the specific surface area decreases during heat treatment.

Examples of a preferred aspect of step (a) include a step of adding a silica source and a phosphorus component to a basic aqueous solution of an aluminum salt to prepare a basic mixed aqueous solution containing a basic aluminum salt, and adding an acidic aqueous solution of an aluminum salt to the mixed aqueous solution.

Step (b):

Next, a first aging step of aging the inorganic composite oxide hydrate slurry obtained in step (a) is performed. The first aging step is carried out, for example, by holding the inorganic composite oxide hydrate slurry at 50 to 70° C. for 30 minutes or more with stirring.

Step (c):

Then, the aged inorganic composite oxide hydrate slurry obtained in step (b) is dehydrated, and then the slurry is washed with heated water, for example, an aqueous solution containing ammonia.

Step (d):

A second aging step is performed in which ion-exchanged water is added to the washed cake-like inorganic composite oxide hydrate slurry to form a slurry, which is then aged. The second aging step is carried out, for example, by adding ammonia water to the slurry obtained by adding ion-exchanged water to adjust the pH to 9.5 to 10.5, and heating it at a temperature of 30° C. or higher, preferably to 100° C. for, for example, 1 to 20 hours, preferably 2 to hours in an aging tank equipped with a reflux condenser while stirring.

Step (e):

The aged product obtained in (d) in the above step is placed in a double-armed kneader with a steam jacket, heat-kneaded and concentrated to form a moldable kneaded product, and then the product is molded into a desired shape, for example, through extrusion molding. A boria source such as boric acid may be optionally added to the kneaded product.

Step (f):

The molded product obtained in step (e) is heat-dried at, for example, 70 to 150° C., preferably 90 to 130° C., and then calcined in an air atmosphere at, for example, 400 to 800° C., preferably 400 to 600° C. for, for example, 0.5 to 10 hours, preferably 2 to 5 hours to give an inorganic composite oxide carrier including alumina as a main component.

The Lewis acid of the inorganic composite oxide carrier is an important factor that influences the dispersibility of the supported metal and the catalytic activity in the hydrotreating catalyst of the present invention. The amount of the Lewis acid can be controlled at any place in the carrier preparation step, together with the control of the composition of the inorganic composite oxide carrier and the crystallinity of the inorganic composite oxide hydrate obtained in step (a). However, it is very difficult to adjust the Lewis acid amount while maintaining the physical properties of the carrier. In order to satisfy this, it is preferable to appropriately set the composition of the inorganic composite oxide carrier, specifically, to accomplish the above-mentioned composition as the composition of the inorganic composite oxide carrier.

<Step (2) of Impregnating Inorganic Composite Oxide Carrier with Impregnating Solution Containing Raw Material for Metal Component>

In step (2), the inorganic composite oxide carrier is impregnated with an impregnating solution including a raw material for a first metal, a raw material for a second metal, a solvent, a phosphorus component, and an organic acid.

As the raw material for the first metal, for example, molybdenum trioxide, ammonium molybdate, ammonium metatungstate, ammonium paratungstate, or tungsten trioxide is preferable. Further, as the raw material for the second metal, for example, nickel nitrate, nickel carbonate, cobalt nitrate, or cobalt carbonate is preferable.

Water is used as the solvent.

As the phosphorus component, orthophosphoric acid (hereinafter, also referred to simply as "phosphoric acid"), ammonium dihydrogen phosphate, diammonium hydrogen phosphate, trimetaphosphoric acid, pyrophosphoric acid, tripolyphosphoric acid or the like is preferable.

The concentration of phosphorus in the impregnating solution is preferably 0.5 to 5.0 mass % in terms of oxide ($P_2O_5$). When the phosphorus concentration is 0.5 mass % or more, the acid properties of the surface of the obtained catalyst can be maintained. From the viewpoint of preventing a decrease in surface area of the obtained catalyst or a decrease in amount of carbon monoxide adsorbed as an index of the dispersibility of the active metal, the phosphorus concentration is preferably 5.0 mass % or less.

It is preferable to add an organic acid to the impregnating solution to bring the pH to 4 or less to dissolve the metal component. As the organic acid, for example, citric acid, malic acid, tartaric acid, ethylenediaminetetraacetic acid (EDTA), or diethylenetriaminepentaacetic acid (DTPA) can be used, and citric acid or malic acid is particularly preferably used.

Further, an organic additive may be used in addition to the organic acid, and examples of the organic additive include saccharides (monosaccharides, disaccharides, polysaccharides or the like). Specifically, for example, glucose ($C_6H_{12}O_6$), fructose ($C_6H_{12}O_6$), maltose ($C_{12}H_{22}O_{11}$), lactose ($C_{12}H_{22}O_{11}$), sucrose ($C_{12}H_{22}O_{11}$) or the like may be added.

The impregnating solution can be prepared by mixing the respective components by a conventional method.

The prepared impregnating solution is impregnated into the inorganic composite oxide carrier by contacting it with the inorganic composite oxide carrier.

The amount of each component contained in the impregnating solution may be appropriately set so as to give a hydrotreating catalyst having the above-mentioned composition.

<Step (3) of Drying and Calcining Inorganic Composite Oxide Carrier Impregnated with Impregnating Solution>

In step (3), the inorganic composite oxide carrier impregnated with the impregnating solution is heat-treated at usually 100 to 350° C., preferably 110 to 320° C., more preferably 150 to 300° C. for usually 0.5 to 24 hours, preferably 0.5 to 4.0 hours to be dried, and then heat-treated at usually 350 to 600° C., preferably 400 to 600° C., more preferably 420 to 600° C. for usually 0.5 to 5.0 hours, preferably 0.5 to 2.0 hours to be calcined, thereby giving the hydrotreating catalyst of the present invention in which the active metal component is supported on the inorganic composite oxide carrier.

When the temperature at the time of the drying is 100° C. or higher, deterioration of operability due to residual moisture can be prevented, and the metal-supported state can be made uniform. Further, when the temperature at the time of the calcining is 600° C. or lower, aggregation of the first metal and the second metal can be prevented, and these metals can be well dispersed on the carrier.

Examples

Hereinafter, the present invention will be specifically described with reference to examples, but is not limited thereto.

[Measuring Method]

Various measurements were performed as follows.

<Method for Measuring Carbon Content>

The carbon content of the catalyst was measured by burning in a high-frequency furnace of a carbon analyzer (EMIA-320V, manufactured by HORIBA, Ltd.).

<Method for Measuring Carrier Surface Area (Specific Surface Area $N_2$) as Determined by BET Single-Point Method for Measuring Nitrogen Adsorption/Desorption>

Approximately 30 mL of a measurement specimen was collected in a magnetic crucible (B-2 type), heat-treated at a temperature of 300° C. for 2 hours, and then placed in a desiccator to be cooled to room temperature, to give a measurement sample. Next, 1 g of this sample was taken, and the specific surface area ($m^2$/g) of the specimen was measured by the BET method using a fully automatic surface area measuring device (Multisorb 12, manufactured by Yuasa Ionics Co., Ltd.).

<Method for Measuring Lewis Acid Amount and Brönsted Acid Amount>

A disk having an inner diameter of 20 mm was filled with 33 mg of the measurement specimen and installed in a measuring device (FT-IR4600, manufactured by JASCO Corporation). The measurement atmosphere was evacuated at 500° C. for 1 hour and then cooled to 30° C. Then, the temperature was raised to 150° C. again, and pyridine was adsorbed on the specimen to give a pyridine adsorption spectrum. Further, the measurement atmosphere was evacuated at 250° C., and then the spectrum after desorption of pyridine was obtained. Then, the difference spectrum before and after pyridine adsorption was taken, and the Lewis acid amount was determined from the peak value of the absorption band around 1450 cm$^{-1}$.

In the same way, the Brönsted acid amount was determined from the peak value of the absorption band around 1550 cm$^{-1}$.

Each measurement was performed 3 times, and the average values thereof were adopted as the Lewis acid amount and the Brönsted acid amount of each catalyst.

<Method for Measuring Average Pore Diameter and Pore Volume>

The average pore diameter and pore volume were measured by a mercury intrusion method (mercury contact angle: 150 degrees, surface tension: 480 dyn/cm). The pore volume was defined as the volume of pores having a pore diameter of 40 Å or more, and the average pore diameter was defined as the pore diameter corresponding to 50% of the pore volume.

<Method for Measuring Ignition Loss>

The catalyst as the measurement specimen was calcined at 570° C. for 2 hours in an air atmosphere, and the ignition loss was calculated from the amount of mass reduced due to calcining.

<Method for Measuring Amount of Nitrogen Monoxide Adsorbed>

To measure the amount of nitrogen monoxide adsorbed, a fully automatic catalyst gas adsorption amount measuring device (manufactured by Okura Riken Co., Ltd.) was used, and a mixed gas of helium gas and nitrogen monoxide gas (nitrogen monoxide concentration: 10 volume %) was introduced, by pulse, into a sulfurized hydrotreating catalyst, to measure the amount of adsorbed nitrogen monoxide molecules per gram of the hydrotreating catalyst. Specifically, about 0.02 g of the catalyst crushed to 60 mesh or less was weighed and filled in a quartz cell, the catalyst was heated to 360° C. so that a gas of 5% by volume of hydrogen sulfide/95% by volume of hydrogen was allowed to flow at a flow rate of 0.2 liter/min to perform sulfurization treatment for 1 hour. Then, it was held at 340° C. for 1 hour to discharge the physically adsorbed hydrogen sulfide to the outside of the system. Thereafter, nitrogen monoxide molecules were adsorbed at 50° C. with a mixed gas of helium gas and nitrogen monoxide gas to measure the amount of adsorbed nitrogen monoxide molecules.

[Production of Hydrotreating Catalyst and the Like]

Preparation examples of inorganic composite oxide carriers, preparation examples of impregnating solutions, preparation examples of a hydrotreating catalyst which are examples of the present invention using each inorganic composite oxide carrier and each impregnating solution, and preparation examples of a hydrotreating catalyst which are comparative examples using each inorganic composite oxide carrier and each impregnating solution, will be described below.

First, preparation examples of the inorganic composite oxide carriers will be described.

<Preparation of Inorganic Composite Oxide Carrier A>

Step a) In a steam-jacketed tank with a capacity of 100 L (liter), 8.64 kg of an aqueous sodium aluminate solution having an aluminum concentration of 22.0 mass % in terms of Al$_2$O$_3$ concentration was placed, and diluted with 34.6 kg of ion-exchanged water, and then, 1.5 kg of a sodium silicate solution having a silicon concentration of 5.0 mass % in terms of SiO2 concentration and 3.0 kg of a sodium phosphate solution having a phosphorus concentration of 2.5 mass % in terms of P$_2$O$_5$ concentration were added with stirring. These were heated to 60° C. with stirring to prepare a basic mixed aqueous solution of an aluminum salt. Further, 13.57 kg of an aqueous aluminum sulfate solution having an aluminum concentration of 7.0 mass % in terms of Al$_2$O$_3$ concentration was diluted with 24.43 kg of ion-exchanged water and heated to 60° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry A containing silica, phosphorus component and alumina with a pH after mixing of 7.2.

Step b) The hydrate slurry A was aged by stirring at ° C. for 60 minutes.

Step c) The slurry obtained in step b) was dehydrated and then washed with 120 L of an aqueous ammonia solution having a concentration of 0.3 mass %.

Step d) The washed slurry obtained in step c) was diluted with ion-exchanged water so that the aluminum concentration became 10.0 mass % in terms of Al$_2$O$_3$ to form a slurry, and then ammonia water having a concentration of 15.0 mass % was added to adjust the pH to 10.3, and the slurry was aged by stirring at 95° C. for 10 hours.

Step e) The slurry after aging obtained in step d) was dehydrated, heated while kneading using a double-armed kneader with a steam jacket, and concentrated and kneaded until a predetermined water content was reached, so that a kneaded product A was obtained. The kneaded product A was molded into a cylinder with a diameter of 1.6 mm using a screw-type extruder.

Step f) Next, the obtained molded product was dried at 110° C. for 12 hours and then calcining at 550° C. for 3 hours to give a carrier A. The physical properties of the carrier A are shown in Table 1.

<Preparation of Inorganic Composite Oxide Carrier B>

Step a) In a steam-jacketed tank with a capacity of 100 L (liter), 8.41 kg of an aqueous sodium aluminate solution having an aluminum concentration of 22.0 mass % in terms of Al$_2$O$_3$ concentration was placed, and diluted with 32.8 kg of ion-exchanged water, and then, 1.5 kg of a sodium silicate solution having a silicon concentration of 5.0 mass % in terms of SiO2 concentration and 6.0 kg of a sodium phosphate solution having a phosphorus concentration of 2.5 mass % in terms of P$_2$O$_5$ concentration were added with stirring. These were heated to 60° C. with stirring to prepare a basic mixed aqueous solution of an aluminum salt. Further, 13.21 kg of an aqueous aluminum sulfate solution having an aluminum concentration of 7.0 mass % in terms of Al$_2$O$_3$ concentration was diluted with 23.79 kg of ion-exchanged water and heated to ° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry B containing silica, phosphorus component and alumina with a pH after mixing of 7.3. A carrier B was obtained in the same manner as in steps b) to f) of the preparation of the carrier A except that the hydrate slurry A was changed to the hydrate slurry B. The physical properties of the carrier B are shown in Table 1.

<Preparation of Inorganic Composite Oxide Carrier C>

Step a) In a steam-jacketed tank with a capacity of 100 L (liter), 8.75 kg of an aqueous sodium aluminate solution having an aluminum concentration of 22.0 mass % in terms of $Al_2O_3$ concentration was placed, and diluted with 35.5 kg of ion-exchanged water, and then, 1.5 kg of a sodium silicate solution having a silicon concentration of 5.0 mass % in terms of SiO2 concentration and 1.4 kg of a sodium phosphate solution having a phosphorus concentration of 2.5 mass % in terms of $P_2O_5$ concentration were added with stirring. These were heated to 60° C. with stirring to prepare a basic mixed aqueous solution of an aluminum salt. Further, 13.76 kg of an aqueous aluminum sulfate solution having an aluminum concentration of 7.0 mass % in terms of $Al_2O_3$ concentration was diluted with 24.76 kg of ion-exchanged water and heated to ° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry C containing silica, phosphorus component and alumina with a pH after mixing of 7.0. A carrier C was obtained in the same manner as in steps b) to f) of the preparation of the carrier A except that the hydrate slurry A was changed to the hydrate slurry C. The physical properties of the carrier C are shown in Table 1.

<Preparation of Inorganic Composite Oxide Carrier D>

Step a) In a steam-jacketed tank with a capacity of 100 L (liter), 7.98 kg of an aqueous sodium aluminate solution having an aluminum concentration of 22.0 mass % in terms of $Al_2O_3$ concentration was placed, and diluted with 31.8 kg of ion-exchanged water, and then, 3.9 kg of a sodium silicate solution having a silicon concentration of 5.0 mass % in terms of SiO2 concentration and 3.0 kg of a sodium phosphate solution having a phosphorus concentration of 2.5 mass % in terms of $P_2O_5$ concentration were added with stirring. These were heated to 60° C. with stirring to prepare a basic mixed aqueous solution of an aluminum salt. Further, 13.93 kg of an aqueous aluminum sulfate solution having an aluminum concentration of 7.0 mass % in terms of $Al_2O_3$ concentration was diluted with 25.07 kg of ion-exchanged water and heated to ° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry D containing silica, phosphorus component and alumina with a pH after mixing of 7.3. A carrier D was obtained in the same manner as in steps b) to f) of the preparation of the carrier A except that the hydrate slurry A was changed to the hydrate slurry D. The physical properties of the carrier D are shown in Table 1.

<Preparation of Inorganic Composite Oxide Carrier E>

Step a) In a steam-jacketed tank with a capacity of 100 L (liter), 8.77 kg of an aqueous sodium aluminate solution having an aluminum concentration of 22.0 mass % in terms of $Al_2O_3$ concentration was placed, and diluted with 34.4 kg of ion-exchanged water, and then, 0.3 kg of a sodium silicate solution having a silicon concentration of 5.0 mass % in terms of SiO2 concentration and 3.6 kg of a sodium phosphate solution having a phosphorus concentration of 2.5 mass % in terms of $P_2O_5$ concentration were added with stirring. These were heated to 60° C. with stirring to prepare a basic mixed aqueous solution of an aluminum salt. Further, 13.79 kg of an aqueous aluminum sulfate solution having an aluminum concentration of 7.0 mass % in terms of $Al_2O_3$ concentration was diluted with 24.81 kg of ion-exchanged water and heated to ° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry E containing silica, phosphorus component and alumina with a pH after mixing of 7.0. A carrier E was obtained in the same manner as in steps b) to f) of the preparation of the carrier A except that the hydrate slurry A was changed to the hydrate slurry E. The physical properties of the carrier E are shown in Table 1.

<Preparation of Inorganic Composite Oxide Carrier F>

Step a) In a steam-jacketed tank with a capacity of 100 L (liter), 8.37 kg of an aqueous sodium aluminate solution having an aluminum concentration of 22.0 mass % in terms of $Al_2O_3$ concentration was placed, and diluted with 37.0 kg of ion-exchanged water, and then, 1.2 kg of a sodium silicate solution having a silicon concentration of 5.0 mass % in terms of SiO2 concentration and 3.6 kg of a sodium phosphate solution having a phosphorus concentration of 2.5 mass % in terms of $P_2O_5$ concentration were added with stirring. These were heated to 60° C. with stirring to prepare a basic mixed aqueous solution of an aluminum salt. In addition, an aqueous aluminum sulfate solution obtained by diluting 11.82 kg of 7.0 mass % aqueous aluminum sulfate solution in terms of $Al_2O_3$ concentration with 21.29 kg of ion-exchanged water and an aqueous titanium sulfate solution obtained by diluting kg of 33 mass % titanium sulfate in terms of TiO 2 concentration with ion-exchanged water to 3.00 kg were mixed together, and the mixture was heated to 60° C. to prepare an acidic mixed aqueous solution.

Next, while stirring the basic mixed aqueous solution in the tank, the heated aqueous acidic mixed solution was added thereto at a constant rate over 10 minutes to prepare a hydrate slurry F containing silica, phosphorus component, titania and alumina with a pH after mixing of 7.1. A carrier F was obtained in the same manner as in steps b) to f) of the preparation of the carrier A except that the hydrate slurry A was changed to the hydrate slurry F. The physical properties of the carrier F are shown in Table 1.

<Preparation of Inorganic Composite Oxide Carrier G>

Step a) In a steam-jacketed tank with a capacity of 100 L (liter), 7.69 kg of an aqueous sodium aluminate solution having an aluminum concentration of 22.0 mass % in terms of $Al_2O_3$ concentration was placed, and diluted with 32.4 kg of ion-exchanged water, and then, 1.6 kg of a sodium silicate solution having a silicon concentration of 5.0 mass % in terms of SiO2 concentration and 1.6 kg of a sodium phosphate solution having a phosphorus concentration of 2.5 mass % in terms of $P_2O_5$ concentration were added with stirring. These were heated to 60° C. with stirring to prepare a basic mixed aqueous solution of an aluminum salt. Further, 12.09 kg of 7.0 mass % aqueous aluminum sulfate solution in terms of $Al_2O_3$ concentration was diluted with 21.75 kg of ion-exchanged water and heated to 60° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry G containing silica, phosphorus component and alumina with a pH after mixing of 7.2. Then, the same operations as in steps b) to d) of the preparation of the carrier A were performed except that the hydrate slurry A was changed to the hydrate slurry G.

Step e) The slurry after aging obtained in step d) was dehydrated, heated while kneading with a double-armed kneader with a steam jacket, and concentrated and kneaded until a predetermined water content was reached. Further, 0.08 kg of boric acid was mixed, and water was then added while kneading the mixture for 10 minutes to attain a predetermined water content, so that a kneaded product G was obtained.

Then, a carrier G was obtained in the same manner as in step f) of the preparation of the carrier A except that the kneaded product A was changed to the kneaded product G. The physical properties of the carrier G are shown in Table 1.

<Preparation of Inorganic Composite Oxide Carrier H> a) In a steam-jacketed tank with a capacity of 100 L (liter), 8.77 kg of an aqueous sodium aluminate solution having an aluminum concentration of 22.0 mass % in terms of $Al_2O_3$ concentration was placed, and diluted with 38.6 kg of ion-exchanged water, and then, 1.2 kg of a sodium silicate solution having a silicon concentration of 5.0 mass % in terms of SiO2 concentration and 4.2 kg of a sodium phosphate solution having a phosphorus concentration of 2.5 mass % in terms of $P_2O_5$ concentration were added with stirring. These were heated to 60° C. with stirring to prepare a basic mixed aqueous solution of an aluminum salt. In addition, an aqueous aluminum sulfate solution obtained by diluting 12.52 kg of 7.0 mass % aqueous aluminum sulfate solution in terms of $Al_2O_3$ concentration with 22.54 kg of ion-exchanged water and an aqueous magnesium sulfate solution obtained by diluting 0.18 kg of 16.0 mass % magnesium sulfate in terms of MgO concentration with ion-exchanged water to 0.60 kg were mixed together, and the mixture was heated to 60° C. to prepare an aqueous acidic mixed solution.

Next, while stirring the basic mixed aqueous solution in the tank, the heated aqueous acidic mixed solution was added thereto at a constant rate over 10 minutes to prepare a hydrate slurry H containing silica, phosphorus component, magnesia and alumina with a pH after mixing of 8.0. A carrier H was obtained in the same manner as in steps b) to f) of the preparation of the carrier A except that the hydrate slurry A was changed to the hydrate slurry H. The physical properties of the carrier H are shown in Table 1.

<Preparation of Inorganic Composite Oxide Carrier I>

A carrier I for a hydrotreating catalyst was obtained in the same manner as in the preparation of the carrier A except that the calcining conditions in step f) were changed to 650° C. and 3 hours. The physical properties of the carrier I are shown in Table 1.

The preparation of inorganic composite oxide carriers J, K, L, and M will be described below. These carriers J, K, L, and M are carriers used only in comparative examples.

<Preparation of Inorganic Composite Oxide Carrier J>

Step a) In a steam-jacketed tank with a capacity of 100 L (liter), 8.86 kg of an aqueous sodium aluminate solution having an aluminum concentration of 22.0 mass % in terms of $Al_2O_3$ concentration was placed and diluted with 36.4 kg of ion-exchanged water. Then, 117.0 g of an aqueous sodium gluconate solution having a concentration of 26.0 mass % and 1.5 kg of a sodium silicate solution having a silicon concentration of 5.0 mass % in terms of SiO2 concentration were added to this solution with stirring. These were heated to 60° C. while stirring to prepare a basic mixed aqueous solution of an aluminum salt. Further, 13.93 kg of 7.0 mass % aqueous aluminum sulfate solution in terms of $Al_2O_3$ concentration was diluted with 25.07 kg of ion-exchanged water and heated to 60° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry J containing silica and alumina. A carrier J was obtained in the same manner as in steps b) to f) of the preparation of the carrier A except that the hydrate slurry A was changed to the hydrate slurry J. The physical properties of the carrier J are shown in Table 1.

<Preparation of Inorganic Composite Oxide Carrier K>

Step a) In a steam-jacketed tank with a capacity of 100 L (liter), 8.86 kg of an aqueous sodium aluminate solution having an aluminum concentration of 22.0 mass % in terms of $Al_2O_3$ concentration was placed, and diluted with 34.9 kg of ion-exchanged water. Then, 3.0 kg of a sodium phosphate solution having a phosphorus concentration of 2.5 mass % in terms of $P_2O_5$ concentration was added with stirring. The solution was heated to 60° C. with stirring to prepare a basic mixed aqueous solution of an aluminum salt. Further, 13.93 kg of 7.0 mass % aqueous aluminum sulfate solution in terms of $Al_2O_3$ concentration was diluted with 25.07 kg of ion-exchanged water and heated to 60° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry K containing phosphorus component and alumina. A carrier K was obtained in the same manner as in steps b) to f) of the preparation of the carrier A except that the hydrate slurry A was changed to the hydrate slurry K. The physical properties of the carrier K are shown in Table 1.

<Preparation of Inorganic Composite Oxide Carrier L>

Step a) In a steam-jacketed tank with a capacity of 100 L (liter), 9.38 kg of an aqueous sodium aluminate solution having an aluminum concentration of 22 mass % in terms of $Al_2O_3$ concentration was placed, and diluted with 38.8 kg of ion-exchanged water. Then, 120.0 g of 26.0 mass % aqueous sodium gluconate solution was added to this solution. The solution was heated to 60° C. with stirring to prepare a basic mixed aqueous solution of an aluminum salt. Further, 13.39 kg of 7 mass % aqueous aluminum sulfate solution in terms of $Al_2O_3$ concentration was diluted with 24.11 kg of ion-exchanged water and heated to 60° C. to prepare an aqueous aluminum sulfate solution.

Next, while stirring the basic mixed aqueous solution in the tank, the heated aqueous aluminum sulfate solution was added thereto at a constant rate over 10 minutes to prepare a hydrate slurry L containing alumina. The same operations as in steps b) to d) of the preparation of the carrier A were performed except that the hydrate slurry A was changed to the hydrate slurry L.

Step e) The slurry after aging obtained in step d) was dehydrated, heated while kneading using a double-armed kneader with a steam jacket, and concentrated and kneaded until a predetermined water content was reached. Further, kg of zeolite having an SiO2/$Al_2O_3$ ratio (molar ratio) of and a crystal lattice constant of 2.457 nm was mixed, and water was then added while kneading the mixture for 10 minutes to attain a predetermined water content, so that a kneaded product L was obtained.

Then, a carrier L was obtained in the same manner as in step f) of the preparation of the carrier A except that the kneaded product A was changed to the kneaded product L. The physical properties of the carrier L are shown in Table 1.

<Preparation of Inorganic Composite Oxide Carrier M>

Step a) In a steam-jacketed tank with a capacity of 100 L (liter), 8.77 kg of an aqueous sodium aluminate solution having an aluminum concentration of 22.0 mass % in terms of $Al_2O_3$ concentration was placed, and diluted with 35.6 kg of ion-exchanged water, and then, 1.5 kg of a sodium silicate solution having a silicon concentration of 5.0 mass % in terms of SiO2 concentration and 1.2 kg of a sodium phosphate solution having a phosphorus concentration of 2.5 mass % in terms of $P_2O_5$ concentration were added with stirring. These were heated to 60° C. with stirring to prepare a basic mixed aqueous solution of an aluminum salt. Further, an aqueous aluminum sulfate solution obtained by diluting 13.79 kg of 7.0 mass % aqueous aluminum sulfate solution in terms of $Al_2O_3$ concentration with 24.81 kg of ion-exchanged water was heated to 60° C. to prepare an aqueous acidic mixed solution.

Next, while stirring the basic mixed aqueous solution in the tank, the heated aqueous acidic mixed solution was added thereto at a constant rate over 10 minutes to prepare a hydrate slurry M containing silica, phosphorus component, and alumina with a pH after mixing of 7.3. A carrier M was obtained in the same manner as in steps b) to f) of the preparation of the carrier A except that the hydrate slurry A was changed to the hydrate slurry M. The physical properties of the carrier M are shown in Table 1.

phosphoric acid and 131 g of citric acid were added and dissolved to prepare an impregnating solution b. The composition and the like of the impregnating solution b are shown in Table 2.

<Preparation of Impregnating Solution c>

In 700 ml of ion-exchanged water, suspended were 232 g of molybdenum trioxide, 63 g of cobalt carbonate and 7 g of nickel carbonate. This suspension was heated to 90° C. for 5 hours with an appropriate reflux condenser applied so that the liquid volume did not decrease. Then, 21 g of phosphoric acid and 64 g of citric acid were added and dissolved to prepare an impregnating solution c. The composition and the like of the impregnating solution c are shown in Table 2.

<Preparation of Impregnating Solution d>

In 700 ml of ion-exchanged water, suspended were 244 g of molybdenum trioxide, 99 g of cobalt carbonate and 12 g of nickel carbonate. This suspension was heated to 90° C. for 5 hours with an appropriate reflux condenser applied so that the liquid volume did not decrease. Then, 71 g of phosphoric acid and 102 g of citric acid were added and dissolved to

TABLE 1

| Carrier species No | Carrier composition | | | | | | | Physical property of carrier | | |
|---|---|---|---|---|---|---|---|---|---|---|
| | Al2O3 Mass% | P2O5 Mass % | B2O3 Mass % | SiO2 Mass % | TiO2 Mass % | MgO Mass % | Zeolite Mass % | Specific surface area N2 m2/g | Pore volume mL/g | Average pore diameter Å |
| A | 95.0 | 2.5 | | 2.5 | | | | 345 | 0.73 | 80 |
| B | 92.5 | 5.0 | | 2.5 | | | | 338 | 0.72 | 77 |
| C | 96.3 | 1.2 | | 2.5 | | | | 328 | 0.75 | 83 |
| D | 91.0 | 2.5 | | 6.5 | | | | 353 | 0.70 | 84 |
| E | 96.5 | 3.0 | | 0.5 | | | | 284 | 0.76 | 93 |
| F | 90.0 | 3.0 | | 2.0 | 5.0 | | | 341 | 0.74 | 88 |
| G | 94.0 | 1.5 | 1.5 | 3.0 | | | | 348 | 0.70 | 71 |
| H | 93.5 | 3.5 | | 2.0 | | 1.0 | | 327 | 0.72 | 78 |
| I | 95.0 | 2.5 | | 2.5 | | | | 282 | 0.73 | 80 |
| J | 97.5 | | | 2.5 | | | | 288 | 0.77 | 89 |
| K | 97.5 | 2.5 | | | | | | 275 | 0.80 | 97 |
| L | 90.0 | | | | | | 10.0 | 372 | 0.81 | 92 |
| M | 96.5 | 1.0 | | 2.5 | | | | 327 | 0.74 | 83 |

Next, preparation examples of impregnating solutions will be described.

<Preparation of Impregnating Solution a>

In 700 ml of ion-exchanged water, suspended were 237 g of molybdenum trioxide (containing 99.9 mass % of molybdenum in terms of $MoO_3$ concentration; the same applies to the following), 96 g of cobalt carbonate (containing 61.5 mass % of cobalt in terms of CoO concentration; the same applies to the following), and 12 g of nickel carbonate (containing 55.0 mass % of nickel in terms of NiO concentration; the same applies to the following). This suspension was heated to ° C. for 5 hours with an appropriate reflux condenser applied so that the liquid volume did not decrease. Then, 22 g of phosphoric acid (containing 61.1 mass % of phosphorus in terms of $P_2O_5$ concentration; the same applies to the following) and 99 g of citric acid were added and dissolved to prepare an impregnating solution a. The composition and the like of the impregnating solution a are shown in Table 2.

<Preparation of Impregnating Solution b>

In 700 ml of ion-exchanged water, suspended were 242 g of molybdenum trioxide, 116 g of cobalt carbonate and 29 g of nickel carbonate. This suspension was heated to 90° C. for 5 hours with an appropriate reflux condenser applied so that the liquid volume did not decrease. Then, 22 g of prepare an impregnating solution d. The composition and the like of the impregnating solution d are shown in Table 2.

<Preparation of Impregnating Solution e>

In 700 ml of ion-exchanged water, suspended were 236 g of molybdenum trioxide, 96 g of cobalt carbonate and 12 g of nickel carbonate. This suspension was heated to 90° C. for 5 hours with an appropriate reflux condenser applied so that the liquid volume did not decrease. Then, 11 g of phosphoric acid and 98 g of citric acid were added and dissolved to prepare an impregnating solution e. The composition and the like of the impregnating solution e are shown in Table 2.

<Preparation of Impregnating Solution f>

In 700 ml of ion-exchanged water, suspended were 237 g of molybdenum trioxide, 96 g of cobalt carbonate and 12 g of nickel carbonate. This suspension was heated to 990° C. for 5 hours with an appropriate reflux condenser applied so that the liquid volume did not decrease. Then, 22 g of phosphoric acid and 165 g of citric acid were added and dissolved to prepare an impregnating solution f. The composition and the like of the impregnating solution f are shown in Table 2.

<Preparation of Impregnating Solution g>

In 700 ml of ion-exchanged water, suspended were 237 g of molybdenum trioxide, 96 g of cobalt carbonate and 12 g of nickel carbonate. This suspension was heated to 90° C. for 5 hours with an appropriate reflux condenser applied so that the liquid volume did not decrease. Then, 22 g of phosphoric acid and 53 g of citric acid were added and dissolved to prepare an impregnating solution g. The composition and the like of the impregnating solution g are shown in Table 2.

<Preparation of Impregnating Solution h>

In 700 ml of ion-exchanged water, suspended were 237 g of molybdenum trioxide, 96 g of cobalt carbonate and 12 g of nickel carbonate. This suspension was heated to 90° C. for 5 hours with an appropriate reflux condenser applied so that the liquid volume did not decrease. Then, 22 g of phosphoric acid and 165 g of malic acid were added and dissolved to prepare an impregnating solution h. The composition and the like of the impregnating solution h are shown in Table 2.

<Preparation of Impregnating Solution i>

In 700 ml of ion-exchanged water, suspended were 196 g of molybdenum trioxide, 80 g of cobalt carbonate and 9 g of nickel carbonate. This suspension was heated to 90° C. for 5 hours with an appropriate reflux condenser applied so that the liquid volume did not decrease. Then, 19 g of phosphoric acid and 81 g of citric acid were added and dissolved to prepare an impregnating solution i. The composition and the like of the impregnating solution i are shown in Table 2.

The preparation of impregnating solutions j, k, 1, m, n and o will be described below. These impregnating solutions j, k, 1 and m are impregnating solutions used only in comparative examples.

<Preparation of Impregnating Solution j>

In 700 ml of ion-exchanged water, suspended were 234 g of molybdenum trioxide, 95 g of cobalt carbonate and 12 g of nickel carbonate. This suspension was heated to 90° C. for 5 hours with an appropriate reflux condenser applied so that the liquid volume did not decrease. Then, 162 g of citric acid was added and dissolved to prepare an impregnating solution j. The composition and the like of the impregnating solution j are shown in Table 2.

<Preparation of Impregnating Solution k>

In 700 ml of ion-exchanged water, suspended were 237 g of molybdenum trioxide, 75 g of cobalt carbonate and 12 g of nickel carbonate. This suspension was heated to 90° C. for 5 hours with an appropriate reflux condenser applied so that the liquid volume did not decrease. Then, 43 g of phosphoric acid was added and dissolved to prepare an impregnating solution k. The composition and the like of the impregnating solution k are shown in Table 2.

<Preparation of Impregnating Solution 1>

In 700 ml of ion-exchanged water, suspended were 249 g of molybdenum trioxide, 149 g of cobalt carbonate and 50 g of nickel carbonate. This suspension was heated to 90° C. for 5 hours with an appropriate reflux condenser applied so that the liquid volume did not decrease. Then, 23 g of phosphoric acid and 176 g of citric acid were added and dissolved to prepare an impregnating solution 1. The composition and the like of the impregnating solution 1 are shown in Table 2.

<Preparation of Impregnating Solution m>

In 700 ml of ion-exchanged water, suspended were 244 g of molybdenum trioxide, 99 g of cobalt carbonate and 12 g of nickel carbonate. This suspension was heated to 90° C. for 5 hours with an appropriate reflux condenser applied so that the liquid volume did not decrease. Then, 66 g of phosphoric acid and 101 g of citric acid were added and dissolved to prepare an impregnating solution m. The composition and the like of the impregnating solution m are shown in Table 2.

<Preparation of Impregnating Solution n>

In 700 ml of ion-exchanged water, suspended were 237 g of molybdenum trioxide and 96 g of cobalt carbonate. This suspension was heated to 90° C. for 5 hours with an appropriate reflux condenser applied so that the liquid volume did not decrease. Then, 32 g of phosphoric acid and 89 g of citric acid were added and dissolved to prepare an impregnating solution n. The physical properties of the impregnating solution n are shown in Table 2.

<Preparation of Impregnating Solution o>

In 700 ml of ion-exchanged water, suspended were 237 g of molybdenum trioxide and 108 g of nickel carbonate. This suspension was heated to 90° C. for 5 hours with an appropriate reflux condenser applied so that the liquid volume did not decrease. Then, 32 g of phosphoric acid and 89 g of citric acid were added and dissolved to prepare an impregnating solution o. The physical properties of the impregnating solution o are shown in Table 2.

TABLE 2

| | Composition (For the first metal, second metal and phosphorus, their types and amounts as oxides are indicated.) | | | | | | | | | | |
|---|---|---|---|---|---|---|---|---|---|---|---|
| Impregnating solution No | First metal Mo | Amount Mass % | Second metal Co | Amount Mass % | Second metal Ni | Amount Mass % | Phosphorus P | Amount Mass % | Ratio of active metal component in catalyst Mass % | Organic acid species | (CoO + NiO)/MoO3 Ratio | P2O5/MoO3 Ratio |
| a | MoO3 | 18.0 | CoO | 4.5 | NiO | 0.5 | P2O5 | 1.0 | 24.0 | Citric acid | 0.28 | 0.06 |
| b | MoO3 | 18.0 | CoO | 5.3 | NiO | 1.2 | P2O5 | 1.0 | 25.5 | Citric acid | 0.36 | 0.06 |
| c | MoO3 | 18.0 | CoO | 3.0 | NiO | 0.3 | P2O5 | 1.0 | 22.3 | Citric acid | 0.18 | 0.06 |
| d | MoO3 | 18.0 | CoO | 4.5 | NiO | 0.5 | P2O5 | 3.2 | 26.2 | Citric acid | 0.28 | 0.18 |
| e | MoO3 | 18.0 | CoO | 4.5 | NiO | 0.5 | P2O5 | 0.5 | 23.5 | Citric acid | 0.28 | 0.03 |
| f | MoO3 | 18.0 | CoO | 4.5 | NiO | 0.5 | P2O5 | 1.0 | 24.0 | Citric acid | 0.28 | 0.06 |
| g | MoO3 | 18.0 | CoO | 4.5 | NiO | 0.5 | P2O5 | 1.0 | 24.0 | Citric acid | 0.28 | 0.06 |
| h | MoO3 | 18.0 | CoO | 4.5 | NiO | 0.5 | P2O5 | 1.0 | 24.0 | Malic acid | 0.28 | 0.06 |
| i | MoO3 | 15.5 | CoO | 3.9 | NiO | 0.4 | P2O5 | 0.9 | 20.7 | Citric acid | 0.28 | 0.06 |
| j | MoO3 | 18.0 | CoO | 4.5 | NiO | 0.5 | | | 23.0 | Citric acid | 0.28 | |
| k | MoO3 | 18.0 | CoO | 3.5 | NiO | 0.5 | P2O5 | 2.0 | 24.0 | | 0.22 | 0.11 |
| l | MoO3 | 18.0 | CoO | 6.5 | NiO | 2.0 | P2O5 | 1.0 | 27.5 | Citric acid | 0.47 | 0.06 |
| m | MoO3 | 18.0 | CoO | 4.5 | MiO | 0.5 | P2O5 | 3.0 | 26.0 | Citric acid | 0.28 | 0.17 |
| n | MoO3 | 18.0 | CoO | 4.5 | NiO | 0.0 | P2O5 | 1.5 | 24.0 | Citric acid | 0.25 | 0.08 |
| o | MoO3 | 18.0 | CoO | 0.0 | NiO | 4.5 | P2O5 | 1.5 | 24.0 | Citric acid | 0.25 | 0.08 |

In Table 2, the amount of each element (in terms of oxide, mass %) is a value based on the catalyst. The amounts of metals (in terms of oxide) are each shown in the column to the right of the column showing the oxide.

Example 1: Preparation of Hydrotreating Catalyst

After spray-impregnation of 1000 g of the carrier A with the entire amount of the impregnating solution a, it was dried at 200° C. and further calcined at 550° C. for 1 hour in an electric furnace to give a hydrotreating catalyst (hereinafter, also referred to simply as "catalyst"; the same applies to the following examples).

Examples 2 to 19: Preparation of Hydrotreating Catalysts

The catalysts of Examples 2 to 19 were prepared in the same manner as in Example 1 except that the type of carrier and the type of impregnating solution prepared as described above were combined as shown in Table 3 described later.

Next, comparative examples will be described.

Comparative Examples 1 to 6 and 8: Preparation of Hydrotreating Catalysts

The catalysts of Comparative Examples 1 to 6 and 8 were prepared in the same manner as in Example 1 except that the type of carrier and the type of impregnating solution prepared as described above were combined as shown in Table 3 described later.

Comparative Example 7: Preparation of Hydrotreating Catalyst

The impregnating solution a was used as the impregnating solution, and the entire amount thereof was spray-impregnated into 1000 g of the inorganic composite oxide carrier A, dried at 120° C., so that a hydrotreating catalyst was obtained without calcining.

Table 3 also shows the properties and catalyst performance of each of the catalysts in Examples 1 to 19 and Comparative Examples 1 to 8 obtained as described above.

<Evaluation of Catalyst>

The catalyst performance was evaluated for each of the catalysts of Examples 1 to 19 and Comparative Examples 1 to 8.

(Confirmation Test for Evaluation of Catalyst Performance)

Each catalyst was filled in a fixed bed reactor and pre-sulfurized in order to activate by desorbing the oxygen atoms contained in the catalyst. This treatment was carried out by circulating a liquid or gas containing a sulfur compound in a managed reaction vessel at a temperature of 200° C. to 400° C. and in a hydrogen pressure atmosphere of normal pressure to 100 MPa.

Next, hydrodesulfurization treatment was performed by supplying vacuum gas oil (density: 0.922 g/cm$^3$ at 15° C., sulfur content: 2.58 mass %, nitrogen content: 0.080 mass %) into a fixed-bed flow reactor at a rate of 150 ml/hour to carry out hydropurification. The reaction conditions at that time were a hydrogen partial pressure of 4.5 MPa, a liquid space velocity of 1.5 h$^{-1}$, and a hydrogen-oil ratio of 250 Nm$^3$/kl. Then, the reaction temperature was changed in the range of 350 to 400° C., and the sulfur in the refined oil was analyzed at each temperature to determine the temperature at which the sulfur content in the refined oil was 0.1%. If this temperature was 370° C. or lower, the catalyst was judged to be acceptable, and if it exceeded that temperature, it was judged to be unacceptable.

The results of the confirmation test are shown in Table 3 together with the properties of each of the catalysts and catalyst performance.

(Catalyst Properties and Evaluation Results of Confirmation Test)

Since the Lewis acid amount per unit surface area of the catalyst of Examples 1 to 19 is 0.80 μmol/m$^2$ or more and the Brönsted acid amount is less than 0.05 μmol/m$^2$, the temperature at which the sulfur content in the refined oil, as an index of catalyst performance, is 0.1% is 370° C. or lower.

On the other hand, in Comparative Examples 1 to 5, 7 and 8, the Lewis acid amount per unit surface area of the catalyst is small and the activity is lowered (the temperature at which the sulfur content in the refined oil is 0.1% is high).

In Comparative Example 6, the Brönsted acid amount is 0.05 μmol/m$^2$ due to the zeolite component in the carrier, and the activity is low.

TABLE 3

| | | Carrier species No | Impregnating solution No | Calcing Yes/No | Pa/Ps[*] Ratio | Physical property of catalyst | | | | | |
|---|---|---|---|---|---|---|---|---|---|---|---|
| | | | | | | Specific surface area m2/g | Average pore diameter Å | Lewis acid amount | | Brönsted acid amount | |
| | | | | | | | | μmol/g | μmol/m2 | μmol/g | μmol/m2 |
| Example | 1 | A | a | Yes | 0.53 | 262 | 77 | 307 | 1.17 | 1 | 0.00 |
| Example | 2 | B | a | Yes | 0.26 | 257 | 74 | 284 | 1.11 | 2 | 0.01 |
| Example | 3 | C | a | Yes | 1.10 | 249 | 80 | 218 | 0.87 | 2 | 0.01 |
| Example | 4 | D | a | Yes | 0.53 | 268 | 79 | 290 | 1.08 | 4 | 0.01 |
| Example | 5 | E | a | Yes | 0.44 | 216 | 90 | 212 | 0.98 | 1 | 0.00 |
| Example | 6 | F | a | Yes | 0.44 | 259 | 83 | 300 | 1.16 | 2 | 0.01 |
| Example | 7 | G | a | Yes | 0.88 | 264 | 66 | 332 | 1.26 | 3 | 0.01 |
| Example | 8 | H | a | Yes | 0.38 | 249 | 74 | 256 | 1.03 | 1 | 0.00 |
| Example | 9 | A | b | Yes | 0.54 | 257 | 77 | 315 | 1.23 | 2 | 0.01 |
| Example | 10 | A | c | Yes | 0.51 | 268 | 78 | 221 | 0.82 | 1 | 0.00 |
| Example | 11 | A | d | Yes | 1.73 | 255 | 70 | 267 | 1.05 | 1 | 0.00 |
| Example | 12 | A | e | Yes | 0.26 | 264 | 77 | 243 | 0.92 | 1 | 0.00 |
| Example | 13 | A | f | Yes | 0.53 | 262 | 78 | 290 | 1.11 | 1 | 0.00 |
| Example | 14 | A | g | Yes | 0.53 | 262 | 76 | 274 | 1.05 | 1 | 0.00 |
| Example | 15 | A | h | Yes | 0.53 | 262 | 75 | 222 | 0.85 | 1 | 0.00 |
| Example | 16 | A | i | Yes | 0.45 | 274 | 78 | 218 | 0.80 | 1 | 0.00 |
| Example | 17 | I | a | Yes | 0.53 | 214 | 79 | 204 | 0.95 | 1 | 0.00 |

TABLE 3-continued

| | | | | | | | | | | |
|---|---|---|---|---|---|---|---|---|---|---|
| Example | 18 | A | n | Yes | 0.79 | 262 | 76 | 310 | 1.18 | 0 | 0.00 |
| Example | 19 | A | o | Yes | 0.79 | 262 | 78 | 209 | 0.80 | 0 | 0.00 |
| Comparative Example | 1 | J | a | Yes | | 219 | 87 | 161 | 0.74 | 1 | 0.00 |
| Comparative Example | 2 | K | a | Yes | 0.53 | 209 | 91 | 157 | 0.75 | 1 | 0.00 |
| Comparative Example | 3 | A | j | Yes | | 266 | 77 | 197 | 0.74 | 2 | 0.01 |
| Comparative Example | 4 | A | k | Yes | 1.05 | 262 | 78 | 124 | 0.47 | 1 | 0.00 |
| Comparative Example | 5 | A | l | Yes | 0.55 | 223 | 74 | 171 | 0.77 | 2 | 0.01 |
| Comparative Example | 6 | I | a | Yes | | 283 | 90 | 240 | 0.85 | 13 | 0.05 |
| Comparative Example | 7 | A | a | No | 0.53 | 262 | 78 | 175 | 0.67 | 1 | 0.00 |
| Comparative Example | 8 | M | m | Yes | 4.05 | 225 | 75 | 163 | 0.72 | 2 | 0.01 |

| | | Physical property of catalyst | | | Evaluation Catalyst |
|---|---|---|---|---|---|
| | | Ignition loss (Ig Loss) Mass % | Amount of nitrogen monoxide adsorbed ml/g | Carbon amount Mass % | performance HDS activity ° C. (S = temperature at which 0.1% was reached) |
| Example | 1 | 1.5 | 10.1 | 0.1 | 366 |
| Example | 2 | 1.2 | 10.1 | 0.2 | 367 |
| Example | 3 | 1.4 | 10.0 | 0.1 | 366 |
| Example | 4 | 1.4 | 9.3 | 0.4 | 368 |
| Example | 5 | 1.3 | 10.3 | 0.1 | 365 |
| Example | 6 | 1.4 | 10.3 | 0.2 | 364 |
| Example | 7 | 1.5 | 10.1 | 0.1 | 364 |
| Example | 8 | 1.6 | 9.0 | 0.2 | 369 |
| Example | 9 | 1.1 | 10.0 | 0.3 | 366 |
| Example | 10 | 0.8 | 9.1 | 0.2 | 368 |
| Example | 11 | 1.5 | 9.1 | 0.1 | 368 |
| Example | 12 | 0.7 | 10.2 | 0.2 | 363 |
| Example | 13 | 1.2 | 9.8 | 0.4 | 368 |
| Example | 14 | 0.4 | 9.2 | 0.2 | 367 |
| Example | 15 | 1.3 | 9.3 | 0.2 | 368 |
| Example | 16 | 0.5 | 9.0 | 0.1 | 370 |
| Example | 17 | 0.5 | 9.0 | 0.1 | 369 |
| Example | 18 | 1.3 | 10.6 | 0.1 | 365 |
| Example | 19 | 1.8 | 8.5 | 0.2 | 370 |
| Comparative Example | 1 | 1.2 | 8.5 | 0.1 | 375 |
| Comparative Example | 2 | 1.4 | 8.4 | 0.1 | 376 |
| Comparative Example | 3 | 1.6 | 8.8 | 0.2 | 373 |
| Comparative Example | 4 | 1.4 | 8.4 | 0.2 | 378 |
| Comparative Example | 5 | 1.1 | 8.6 | 0.1 | 373 |
| Comparative Example | 6 | 1.6 | 8.2 | 0.1 | 375 |
| Comparative Example | 7 | 7.8 | 12.7 | 3.9 | 381 |
| Comparative Example | 8 | 1.8 | 8.5 | 0.2 | 379 |

(*)Pa/Ps = Amount of phosphorus in active metal component/Amount of phosphorus in carrier

INDUSTRIAL APPLICABILITY

The hydrotreating catalyst of the present invention is extremely useful in industry because it can hydrotreat a hydrocarbon oil with high desulfurization activity.

The invention claimed is:

1. A hydrotreating catalyst for a hydrocarbon oil, comprising:
   an inorganic composite oxide carrier comprising alumina as a main component, and an active metal component supported on the carrier,
   the active metal component comprising, as active metal species, a first metal which is at least one of molybdenum and tungsten, and a second metal which is at least one of cobalt and nickel,
   the hydrotreating catalyst having a Lewis acid amount and a Brönsted acid amount per unit surface area of 0.80 μmol/m² or more and 0.03 μmol/m² or less, respectively, as measured by pyridine desorption at 250° C. and a BET single-point method.

2. The hydrotreating catalyst for a hydrocarbon oil according to claim 1, wherein a content of the first metal is 15 to 22 mass % in terms of oxide, and a content of the second metal is 2 to 7 mass % in terms of oxide.

3. The hydrotreating catalyst for a hydrocarbon oil according to claim 1, containing less than 2.0 mass % of carbon.

4. The hydrotreating catalyst for a hydrocarbon oil according to claim 1, having a specific surface area of 200 to 350 m$^2$/g.

5. The hydrotreating catalyst for a hydrocarbon oil according to claim 1, having an average pore diameter of 50 to 100 Å as measured by a mercury intrusion method.

6. The hydrotreating catalyst for a hydrocarbon oil according to claim 1, having a mass reduced when heat-treated at 570° C. for 2 hours in an air atmosphere of 5.0 mass % or less.

7. The hydrotreating catalyst for a hydrocarbon oil according to claim 1, having an amount of nitrogen monoxide adsorbed after sulfurization treatment of 8.5 ml/g or more.

8. The hydrotreating catalyst for a hydrocarbon oil according to claim 1, wherein the inorganic composite oxide carrier contains silicon and phosphorus in amounts of 0.5 to 8.0 mass % and 1.0 to 5.0 mass %, respectively, in terms of oxide, assuming that an amount of the carrier is 100 mass %.

9. The hydrotreating catalyst for a hydrocarbon oil according to claim 8, wherein the active metal component contains phosphorus.

10. The hydrotreating catalyst for a hydrocarbon oil according to claim 9, wherein Pa/Ps, which is a ratio of a proportion Pa of phosphorus contained in the active metal component to a proportion Ps of phosphorus contained in the carrier among the phosphorus contained in the catalyst, is in the range of 0.2 to 3.0.

11. The hydrotreating catalyst for a hydrocarbon oil according to claim 9, wherein a proportion of the phosphorus contained in the active metal component to the first metal is in the range of 0.02 to 0.15 in terms of oxide mass.

12. The hydrotreating catalyst for a hydrocarbon oil according to any claim 1, wherein the inorganic composite oxide carrier contains titanium in an amount of 5.0 mass % or less in terms of oxide, magnesium in an amount of 5.0 mass % or less in terms of oxide, or boron in an amount of 5.0 mass % or less in terms of oxide, assuming that the amount of the carrier is 100 mass %.

13. The hydrotreating catalyst for a hydrocarbon oil according to claim 1, wherein a proportion of the second metal to the first metal is in the range of 0.15 to 0.40 in terms of oxide mass.

14. A method for producing a hydrotreating catalyst for a hydrocarbon oil, comprising:
 a step (1) of providing an inorganic composite oxide carrier comprising alumina as a main component, which contains silicon and phosphorus in amounts of 0.5 to 8.0 mass % and 1.0 to 5.0 mass %, respectively, in terms of oxide, assuming that the amount of the carrier is 100 mass %;
 a step (2) of preparing an impregnating solution comprising a raw material for a first metal which is at least one of molybdenum and tungsten, a raw material for a second metal which is at least one of cobalt and nickel, a solvent, a phosphorus component, and an organic acid, and impregnating the inorganic composite oxide carrier with the impregnating solution; and
 a step (3) of drying and then calcining the inorganic composite oxide carrier impregnated with the impregnating solution obtained in the step (2) to give a hydrotreating catalyst.

15. The method for producing a hydrotreating catalyst according to claim 14, wherein the step (1) of providing the inorganic composite oxide carrier comprises:
 a step (a) of adding a silica source and a phosphorus component to a basic aqueous solution of an aluminum salt to prepare a basic mixed aqueous solution containing a basic aluminum salt, and adding an acidic aqueous solution of an aluminum salt to the mixed aqueous solution;
 a first aging step (b) of aging the inorganic composite oxide hydrate slurry obtained in the step (a);
 a step (c) of washing the aged inorganic composite oxide hydrate slurry obtained in the step (b);
 a second aging step (d) of aging the washed inorganic composite oxide hydrate slurry obtained in the step (c);
 a step (e) of kneading and concentrating the aged inorganic composite oxide hydrate slurry obtained in the step (d) and molding the obtained kneaded product; and
 a step (f) of drying and calcining the molded product obtained in the step (e).

16. The method for producing a hydrotreating catalyst according to claim 15, wherein, in the second aging step (d), the washed inorganic composite oxide hydrate slurry obtained in the step (c) is aged with adding ammonia water.

17. A method for hydrotreating a hydrocarbon oil, comprising hydrotreating a hydrocarbon oil in the presence of the hydrotreating catalyst according to claim 1.

\* \* \* \* \*